United States Patent [19]

Weller

[11] Patent Number: 5,356,177

[45] Date of Patent: Oct. 18, 1994

[54] SIDE IMPACT PROTECTION APPARATUS

[75] Inventor: Peter A. Weller, Holland, Mich.

[73] Assignee: Davidson Textron Inc., Dover, N.H.

[21] Appl. No.: 149,832

[22] Filed: Jun. 25, 1993

[51] Int. Cl.⁵ .............................................. B60R 21/04
[52] U.S. Cl. ..................................... 280/751; 293/107
[58] Field of Search ..................... 280/751; 296/146.6, 296/189, 146.1; 293/107

[56] References Cited

U.S. PATENT DOCUMENTS

| | | | |
|---|---|---|---|
| 2,877,049 | 3/1959 | Lucas | 296/49.2 |
| 3,185,497 | 5/1965 | Lagace | 280/150 |
| 3,881,744 | 5/1975 | Tupper | 280/751 |
| 3,930,665 | 1/1976 | Ikawa | 280/751 |
| 3,989,275 | 11/1976 | Finch et al. | 280/751 |
| 4,272,103 | 6/1981 | Schmid et al. | 280/751 |
| 4,783,114 | 11/1988 | Welch | 296/153 |
| 5,098,124 | 3/1992 | Breed et al. | 280/751 |
| 5,102,163 | 4/1992 | Ishikawa | 280/751 |
| 5,141,279 | 8/1992 | Weller | 296/146 D |
| 5,306,066 | 4/1994 | Saethoff | 296/146.6 |

FOREIGN PATENT DOCUMENTS 2220612  1/1990  United Kingdom ................ 280/751

OTHER PUBLICATIONS

Automotive Technologies International, Inc., "Improved Padding to Reduce Injuries in Automobile Accidents".

Primary Examiner—Kenneth R. Rice
Assistant Examiner—Christopher P. Ellis
Attorney, Agent, or Firm—Reising, Ethington, Barnard, Perry & Milton

[57] ABSTRACT

A side impact protection apparatus for use on the inner panel of a vehicle door. The apparatus is a cushion including a hollow flexible skin having an inner wall secured to the inner panel, and flexible walls between the skin and the inner wall, some having an orifice formed therein, to prevent the skin from bulging. Air contained in the cushion is adaptable to flow through inner wall orifice(s), prior to discharge through a side wall orifice, when subjected to impact by the vehicle occupant in the event of a high force side impact against the vehicle.

4 Claims, 1 Drawing Sheet

SIDE IMPACT PROTECTION APPARATUS

TECHNICAL FIELD

This invention relates generally to automotive side impact protection apparati and, more particularly, to improved cushioning on the door inner panel to protect the thorax area of the operator or passenger.

BACKGROUND ART

Heretofore, a multiplicity of cushion arrangements associated with automotive door inner panels have been known to provide protection for the occupants.

Lucas U.S. Pat. No. 2,877,049 discloses a series of sponge rubber scalloped pads of generally rectangular shape on a backing member which is connected to straps adapted to be removably mounted over the window to serve as an arm rest.

Lagace U.S. Pat. No. 3,185,497 discloses a C-shaped, air inflatable element mounted adjacent the rear edge of a vehicle door, with the lower leg of the C-shape thereof positioned below the usual door arm rest.

Finch et al U.S. Pat. No. 3,989,275 discloses a door trim pad molding of rigid plastics foam covered with a layer of semi-rigid plastics foam. The rigid plastics foam portion is formed to include a plurality of integral projections forming discrete cavities, with the projections adapted to collapse on impact.

Schmid U.S. Pat. No. 4,272,103 discloses a flank protection arrangement having a first compressible reinforcement member within the vehicle door, a second one comprising an impact cushion of any suitable known type mounted on the door inner wall lateral of the first member and adjacent the driver's pelvic area, and a third one above the other two adjacent the shoulder and chest area.

Welch U.S. Pat. No. 4,783,114 discloses energy absorbent sections of molded foam positioned between the inner door panel and a trim panel above and below a cavity adjacent an arm rest which is yieldably mounted on the trim panel, and adaptable to collapse into the cavity when contacted by an occupant in the event of a side impact.

Weller U.S. Pat. No. 5,141,279 discloses a side impact protection apparatus wherein a cushion containing any one of a variety of suitable mediums includes a rupturable closure means adaptable to rupture and discharge the medium therethrough upon being impacted by the vehicle occupant.

An *Automotive Technologies International, Inc.* article entitled "Improved Padding to Reduce Injuries in Automobile Accidents" discloses a padding composed of two interleaved units, each containing pluralities of wedge shaped, rectangular cross-section segments joined together to form closed cells filled with air, with each cell containing an orifice through which the air escapes upon impact against the padding by the occupant resulting from a side impact against the vehicle. The preferred padding includes springs mounted in the cells.

Matsuura U.S. Pat. No. 3,680,912 discloses a headrest consisting of front and rear compartments in a tubular hollow member, with the front compartment filled with a fluid, and the compartments separated by a check valve or a resistance tube through which the fluid flows upon receipt of an impact.

DISCLOSURE OF THE INVENTION

A general object of the invention is to provide an improved automotive side impact protection apparatus.

Another object of the invention is to provide an improved cushion arrangement adapted to being mounted on the inner door panel in the area adjacent the occupant's thorax or pelvis.

A further object of the invention is to provide a flexible skin molded in the shape of a hollow cushion and containing air. Flexible walls forming cells inside the hollow skin prevent the latter from bulging under the air pressure.

Still another object of the invention is to provide at least one flexible wall forming each cell with an open orifice therein.

A still further object of the invention is to provide a hollow cushion consisting of an outer flexible skin and an inner wall secured to the inner panel of the door, flexible walls formed therebetween forming a plurality of cells and serving to prevent the skin from bulging. An orifice is formed through at least one wall of each cell and through at least one side wall of the flexible skin, and ambient air exists within the cells, wherein, upon impact, the air will be forced from one cell to another and thence, through an orifice in a side wall from an outer cell. The advantage is that as the air is forced from the impacted cells to adjacent cells, the pressure in the adjacent cells will rise due to the restriction in flow from these cells forcing the pressure in the impacted cells to rise further. Once peak pressure is reached as the impact velocity drops, the air passing through the multiple orifices in series from cell to cell and finally to discharge through the orifice(s) in the side wall(s) of the outer cells will raise the degree of restriction and slow the reduction in pressure.

These and other objects and advantages will become more apparent when reference is made to the following drawings and the accompanying description.

BEST MODE OF CARRYING OUT THE INVENTION

Figure 1:
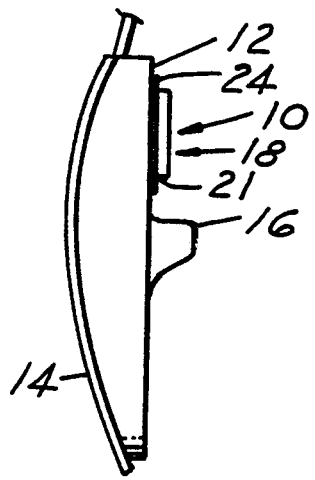
FIG. 1 is an end view of a vehicle door embodying the invention.
Figure 2:
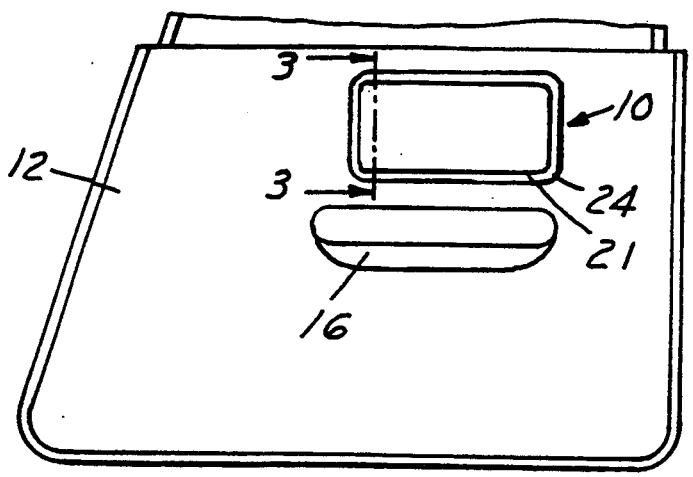
FIG. 2 is a side view taken along the plane of the line 2—2 of FIG. 1, and looking in the direction of the arrows.

Referring now to the drawings in greater detail, FIGS. 1 and 2 illustrate a side impact cushion arrangement 10 mounted on an inner panel 12 of a vehicle door 14, just above the conventional arm rest 16 adjacent the thorax area of the vehicle operator or passenger, represented at 17. A similar cushion arrangement could be placed just below the armrest in the pelvis area of the operator or passenger.

Figure 3:
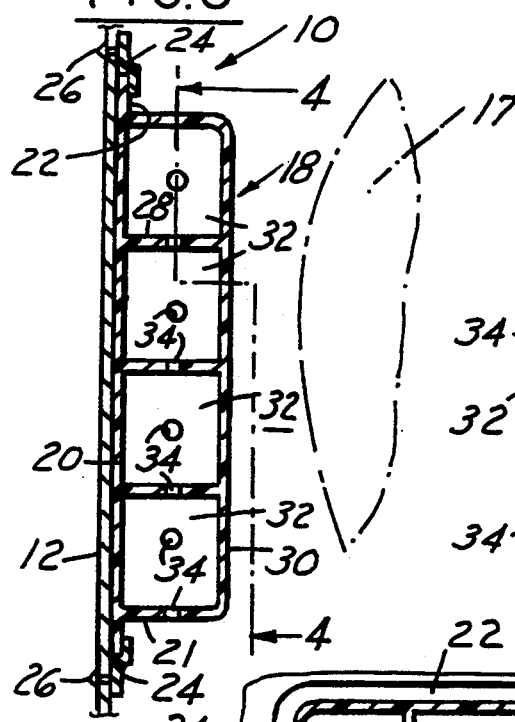
FIG. 3 is an enlarged cross-sectional view of the inventive portion of FIG. 1.

As shown in FIG. 3, the side impact cushion arrangement 10 includes a hollow flexible skin 18 having side walls 21, an inner wall 20 mounted against the inner panel 12, with a peripheral flange 22 retained by a bracket or frame 24 secured to the inner panel by suitable fasteners, such as snap fasteners 26.

The hollow flexible skin 18 is filled with air at atmospheric pressure. A plurality of flexible walls 28 are formed within the hollow flexible skin 18 between the outer 30 and inner 20 walls thereof to prevent the skin 18 from bulging and to divide the cushion into individual cells.

Figure 4:
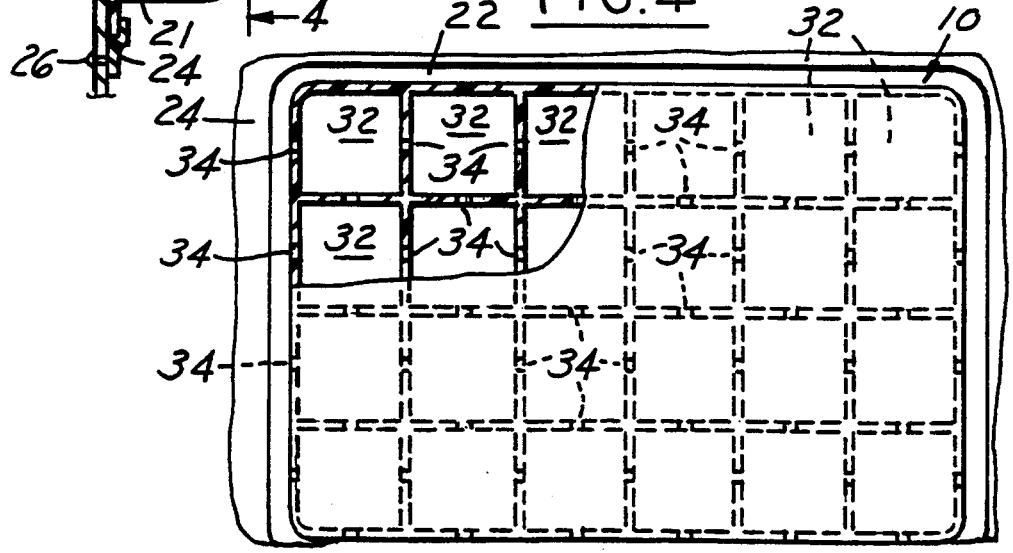
FIG. 4 is a view taken along the plane of the line 4—4 of FIG. 3, and looking in the direction of the arrows.

As shown in FIG. 4, the arrangement 10 includes a plurality of side-by-side and end-to-end cells 32. At least one wall 28 of each cell 32, and each side wall 21, respectively, have an orifice or flow restrictor 34 formed therethrough. Upon initial impact of a cell or group of cells, the resistance will be comparable to that of the single orifice or flow resistor in the inner wall 20 of each cell. As the air is forced from the impacted cells 32 to adjacent cells, the pressure in the adjacent cells will rise due to the restriction in flow through the orifices 34, forcing the pressure in the impacted cells to rise further. Once peak pressure is reached as the impact velocity drops, the air will flow through multiple orifices in series from cell to cell and finally to discharge through the orifices 34 in the side walls 21 of the outer cells while will raise the degree of restriction and slow the reduction in pressure. In addition to this multiple restriction effect, the collapsing and folding of the side walls of the cells tends to reduce the open area of each restrictor, further acting to maintain the pressure, thereby increasing the overall energy absorption while maintaining a soft or low rise initial contact resistance.

Figure 5:
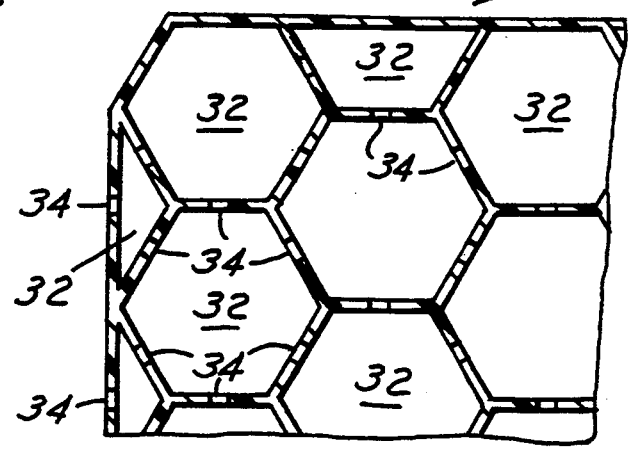
FIG. 5 is a fragmentary view similar to FIG. 4 showing an alternate embodiment.

As shown in FIG. 5, each cell may comprise a cross-sectional shape other than square, such as a hexagonal shape, for example.

The formation of orifices in the sidewall eliminates the need for aligned openings in the inner wall 20 and in the inner door panel 12. As in other known concepts, in the event that the walls 28 separating the cells 32 are insufficient to maintain the cushion 10 in the fully inflated condition, reticulated foam or conical springs (neither shown) can be incorporated in each cell for that purpose.

Industrial Applicability

It should be apparent that the invention provides an improved cushioning for mounting on the vehicle door inner panel to protect the thorax area of the operator or a passenger.

It should be further apparent that the hollow cushion with a flexible outer skin and a plurality of inner flexible walls, some with an orifice formed therethrough, (1) serves to prevent the cushion from bulging and (2) upon impact, as the air is forced from the impacted cells to adjacent cells, the pressure in the adjacent cells will rise due to the restriction in flow from these cells forcing the pressure in the impacted cells to rise further. Once peak pressure is reached as the impact velocity drops, the air passing through the multiple of orifices in series from cell to cell and finally to discharge through the orifice(s) in the side wall(s) of the outer cells will raise the degree of restriction and slow the reduction in pressure, thereby increasing the overall energy absorption while maintaining a soft or low rise initial contact resistance.

While but one embodiment of the invention has been shown and described, other modifications thereof are possible within the scope of the following claims.

What is claimed is:

1. For use on the inner panel of a vehicle door, a side impact protection apparatus comprising a cushion including a flexible skin forming an outer wall, side walls, and an inner wall, said inner wall being secured to the inner panel of said door, flexible wall means formed between said inner wall and said outer wall to prevent said flexible skin from bulging and forming a plurality of cells while includes a plurality of peripheral cells, fully open outlet means formed in said flexible wall means and in said side walls, and air contained within said cells, wherein said air is adaptable to discharge through said outlet means from cell to cell and, thence, through said side walls upon being impacted by the vehicle occupant in the event of a severe side impact against the door.

2. The side impact protection apparatus described in claim 1, wherein said outlet means includes at least one orifice formed in said flexible wall means between adjacent cells and in said side walls adjacent each said peripheral cell.

3. The side impact protection apparatus described in claim 1, wherein said flexible wall means form four sided cells.

4. The side impact protection apparatus described in claim 1, wherein said flexible wall means form six sided cells and said peripheral cells are formed from one of the groups consisting of: six sided, four sided or three sided cells.

* * * * *

UNITED STATES PATENT AND TRADEMARK OFFICE
CERTIFICATE OF CORRECTION

PATENT NO. : 5,356,177
DATED : October 18, 1994
INVENTOR(S) : Peter A. Weller

It is certified that error appears in the above-indentified patent and that said Letters Patent is hereby corrected as shown below:

Column 4, claim 1, line 27, delete "while" and insert --which-- therefor.

Column 4, claim 4, line 46, delete "groups" and insert --group-- therefor.

Signed and Sealed this

Twenty-first Day of February, 1995

Attest:

BRUCE LEHMAN

Attesting Officer      Commissioner of Patents and Trademarks